Figure 1:
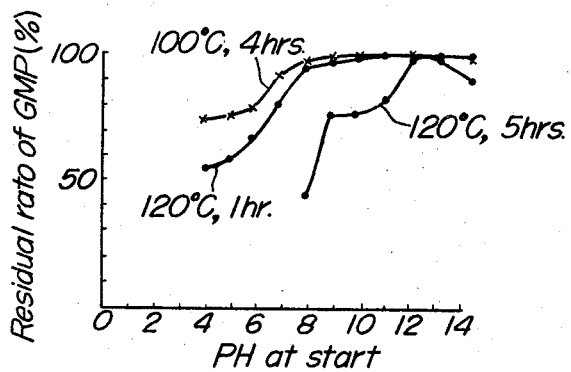

INVENTORS
HIROTOSHI SAMEJIMA
HIROSHI TERANISHI
MINORU ITO

BY

ATTORNEY

United States Patent Office 3,382,233
Patented May 7, 1968

3,382,233
PROCESS FOR PRODUCING
5'-GUANYLIC ACID
Hirotoshi Samejima and Hiroshi Teranishi, Machida-shi, and Minoru Ito, Tokyo, Japan, assignors to Kyowa Hakko Kogyo Co., Ltd., Tokyo, Japan
Continuation-in-part of application Ser. No. 456,961, May 19, 1965. This application Nov. 8, 1966, Ser. No. 592,847
Claims priority, application Japan, May 19, 1964, 39/27,828
6 Claims. (Cl. 260—211.5)

This application is a continuation-in-part of our application Ser. No. 456,961, filed on May 19, 1965, and now abandoned.

This invention relates to a process for producing 5'-guanylic acid. More particularly, it relates to a process for the production of 5'-guanylic acid by hydrolysis. Even more particularly, the invention relates to a process for the production of 5'-guanylic acid by the hydrolysis of certain guanosine polyphosphates at a pH of from 11 to 14 and a temperature of from 80° to 130° C.

Heretofore, 5'-guanylic acid (which may also be termed guanosine monophosphate, GMP) has been obtained by separation from sea food, yeast or pancreas nucleic acid, by fermentation methods, etc. Guanosine-diphosphate (GDP) and guanosine-triphosphate (GTP) are often obtained as by-products in such processes. For example, considerable amounts of GDP and GTP, in addition to GMP, are produced in the fermentation liquor when a fermentation method is employed for the production of GMP. Hence, hydrolysis of the thus obtained GDP and GTP (hereinafter referred to generically as guanosine polyphosphates), in accordance with the present invention, to produce GMP is an extremely useful method of increasing the yield thereof obtained. GMP, as is well known in the art, is an important constituent of cell material of living organisms and is of much utility in biochemical research. It also is useful in producing chemical seasonings.

It has been generally considered in the prior art that the ribosyl bond of a nucleotide is decomposed under acidic conditions and that the phosphoric acid ester bond thereof is decomposed under alkaline conditions. Surprisingly and unexpectedly, the present inventors have found that GMP shows a marked stability and is hardly decomposed at all when heated at a temperature of from 80° to 130° C. under alkaline conditions, whereas, on the other hand, GDP and GTP are decomposed under the same conditions of heating, i.e., at 80° to 130° C., under the alkaline conditions of pH of 11 to 14, particularly at a pH of from 12 to 13.

One of the objects of the present invention is to provide an improved process for the production of 5'-guanylic acid which overcomes the disadvantages and deficiencies of the prior art methods.

Another object of the present invention is to provide a process for producing 5'-guanylic acid by hydrolysis which may be carried out in an efficacious and simple manner.

A further object of the invention is to provide a process for producing 5'-guanylic acid by hydrolysis which gives the product in high purity and good yield.

A still further object of the invention is to provide a process for producing 5'-guanylic acid by hydrolysis which may be carried out advantageously and which may be used as a supplementary measure to, for example, a fermentation process to increase the total yield of product obtained.

These and other objects of the present invention will become apparent to those skilled in the art from a reading of the following specification and claims.

In accordance with the present invention, it has been found that an advantageous method for producing 5'-guanylic acid by hydrolysis is effected by heating a solution containing guanosine polyphosphates having a pH of from 11 to 14, preferably 12 to 13.

Figure 2:
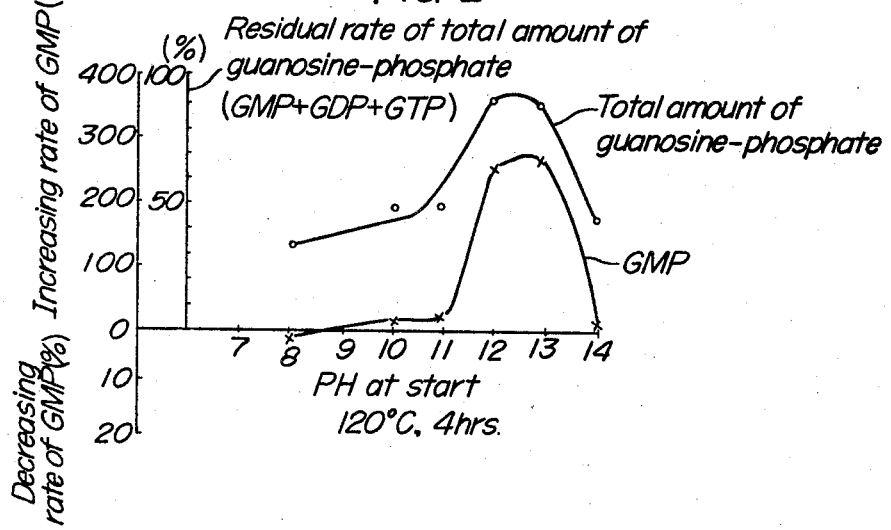

Further features and advantages of the present invention become apparent on the basis of the drawings, wherein:

FIGURE 1 shows a relation between pH and the stability of 5'-guanylic acid when heated, and
FIGURE 2 shows decompositions of GDP and GTP when heated to form 5'-guanylic acid.

As shown in FIGURES 1 and 2, GMP is not decomposed even by heating for 1 hour at 100° to 120° C. at a pH of 11 to 14. Furthermore, GMP is barely decomposed by heating for 5 hours at 120° C. at a pH of from 12 to 13. On the other hand, the guanosine polyphosphates are nearly quantitatively converted into GMP by heating, especially at a temperature of from 100° to 120° C., at a pH of 11 to 14, and more especially at a pH of from 12 to 13.

The following examples are given merely as illustrations of the present invention and are not to be considered as limiting. The amount of GMP noted therein refers to the anhydride thereof. The amount of guanosine polyphosphate noted therein is an amount by weight converted into the anhydride of GMP.

EXAMPLE 1

100 liters of an aqueous solution containing 2.8 mg./ml. of GDP and 2.0 mg./ml. of GTP are adjusted to a pH of 12 with a 28% aqueous ammonia solution and heated at 120° C. for 5 hours. 101 liters of a solution containing 4.5 mg./ml. of GMP, 0.1 mg./ml. of GDP and a trace amount of GTP are obtained at the completion of the heating. Hence, 94.6% of the guanosine polyphosphates is converted into GMP.

EXAMPLE 2

500 liters of a fermentation liquor containing 3.2 mg./ml. of GMP, 0.8 mg./ml. of GDP and 0.6 mg./ml. of GTP adjusted to a pH of 13 with caustic soda (sodium hydroxide) are heated at a temperature of 120° C. for 3 hours. At the completion of the heating, 508 liters of a solution containing 4.2 mg./ml. of GMP, 0.2 mg./ml. of GDP and a trace amount of GTP are obtained. This amounts to a 92.7% conversion of the guanosine polyphosphates into GMP.

EXAMPLE 3

100 liters of a solution containing 3.2 mg./ml. of GMP, 0.6 mg./ml. of GDP and 0.4 mg./ml. of GTP are adjusted to a pH of 12 with NaOH and heated at 80° C. for 100 hours. 102 liters of a solution containing 3.7 mg./ml. of GMP, 0.3 mg./ml. of GDP and a trace amount of GTP are obtained at the completion of the heating. Hence, 81.8% of the guanosine polyphosphates is converted into GMP.

EXAMPLE 4

100 liters of a solution containing 3.2 mg./ml. of GMP, 0.6 mg./ml. of GDP and 0.4 mg./ml. of GTP are adjusted to a pH of 12 with NaOH and heated at 130° C. for one hour. 102 liters of a solution containing 3.9 mg./ml. of GMP, 0.1 mg./ml. of GDP and a trace amount of GTP are obtained at the completion of the heating. Hence, 86.8% of the guanosine polyphosphates is converted into GMP.

The invention being thus described, it will be obvious that the same may be varied in many ways. Such variations are not to be regarded as a departure from the spirit

What is claimed is:

1. A process for producing 5'-guanylic acid which comprises heating a solution containing guanosine polyphosphates at a temperature of from 80° to 130° C., said solution having a pH of from 11 to 14.

2. A process according to claim 1, wherein said temperature is from 100° to 120° C.

3. A process according to claim 1, wherein said pH is from 12 to 13.

4. A process according to claim 1, wherein said guanosine polyphosphates consist of guanosine-diphosphate and guanosine-triphosphate.

5. A process for producing 5'-guanylic acid which comprises heating an aqueous solution containing guanosine-diphosphate and guanosine-triphosphate at a temperature of from 100° to 120° C., said solution having a pH of from 11 to 14.

6. A process according to claim 5, wherein said solution has a pH of from 12 to 13.

References Cited

UNITED STATES PATENTS

| | | | |
|---|---|---|---|
| 3,190,877 | 6/1965 | Ishibashi et al. | 260—211.5 |
| 3,296,087 | 1/1967 | Mitsugi et al. | 260—211.5 |

LEWIS GOTTS, *Primary Examiner.*

J. BROWN, *Assistant Examiner.*